(12) United States Patent
Holec et al.

(10) Patent No.: US 6,220,511 B1
(45) Date of Patent: Apr. 24, 2001

(54) CARD ISSUANCE SYSTEM AND PROCESS

(75) Inventors: Henry Victor Holec, Mendota Heights; William Francis Kraetz, Plymouth, both of MN (US); Dirk R. Helgemo, Sioux City, IA (US); F. Charles Baggeroer, Minnetonka, MN (US)

(73) Assignee: DataCard Corporation, Minnetonka, MN (US)

( * ) Notice: Subject to any disclaimer, the term of this patent is extended or adjusted under 35 U.S.C. 154(b) by 0 days.

(21) Appl. No.: 09/189,747

(22) Filed: Nov. 10, 1998

(51) Int. Cl.[7] .................................................. G06K 5/00
(52) U.S. Cl. .......................... 235/380; 235/381; 235/486; 902/13
(58) Field of Search .................................. 235/486, 380, 235/381, 384, 385; 902/9, 14, 13, 15

(56) References Cited

U.S. PATENT DOCUMENTS

| | | | |
|---|---|---|---|
| 3,483,361 | 12/1969 | Blurton | 235/384 |
| 3,531,106 | 9/1970 | Larson et al. | 271/124 |
| 3,775,593 | 11/1973 | Gieringer et al. | 235/378 |
| 3,949,364 * | 4/1976 | Clark et al. | 340/825.34 |
| 4,385,285 | 5/1983 | Horst et al. | 235/379 |
| 4,429,217 | 1/1984 | Hill et al. | 235/380 |
| 4,593,183 | 6/1986 | Fukatsu | 235/379 |
| 4,641,239 | 2/1987 | Takesako | 705/41 |
| 4,650,977 | 3/1987 | Couch | 235/379 |
| 4,778,982 * | 10/1988 | Beech et al. | 235/375 |
| 4,794,530 | 12/1988 | Yukiura et al. | 705/5 |
| 4,818,854 * | 4/1989 | Davies et al. | 235/381 |
| 4,825,054 | 4/1989 | Rust et al. | 235/380 |
| 4,829,296 * | 5/1989 | Clark et al. | 235/382 |
| 4,884,212 | 11/1989 | Stutsman | 700/237 |
| 4,900,906 * | 2/1990 | Pusic | 235/381 |
| 4,928,230 * | 5/1990 | Kawamura | 235/379 |
| 4,965,438 | 10/1990 | Murofushi | 235/384 |
| 4,968,873 | 11/1990 | Dethloff et al. | 235/380 |
| 4,970,655 | 11/1990 | Winn et al. | 700/235 |
| 4,992,648 * | 2/1991 | Hutchison | 235/379 |
| 5,010,485 | 4/1991 | Bigari | 705/17 |
| 5,036,472 | 7/1991 | Buckley et al. | 700/233 |
| 5,146,067 | 9/1992 | Sloan et al. | 235/381 |
| 5,176,237 | 1/1993 | Yang | 194/211 |
| 5,350,906 | 9/1994 | Brody et al. | 235/379 |
| 5,378,884 | 1/1995 | Lundstrom et al. | 235/441 |
| 5,606,157 * | 2/1997 | Awatsu | 235/379 |
| 5,615,123 | 3/1997 | Davidson et al. | 700/233 |
| 5,637,845 | 6/1997 | Kolls | 235/381 |
| 5,673,309 | 9/1997 | Woynoski et al. | 379/144 |
| 5,696,908 | 12/1997 | Muehlberger et al. | 705/39 |
| 5,710,637 | 1/1998 | Matsumoto | 358/400 |
| 5,714,743 * | 2/1998 | Chiba et al. | 235/449 |
| 5,814,796 | 9/1998 | Benson et al. | 235/375 |

FOREIGN PATENT DOCUMENTS

| | | |
|---|---|---|
| 0 493 127 A2 | 7/1992 | (EP) . |
| 2 246 899 | 2/1992 | (GB) . |

(List continued on next page.)

OTHER PUBLICATIONS

American Express "Express Card Teller" Brochure, p. 1, Nov. 1991.*

ROMMI, *Report on Man/Machine Interfaces*, The Ultimate EFT Battleground, 2 pages of article, Feb., 1992.

*Primary Examiner*—Michael G Lee
*Assistant Examiner*—Diane I. Lee
(74) *Attorney, Agent, or Firm*—Merchant & Gould P.C.

(57) ABSTRACT

A method of secured card issuance from a card issuing machine, as well as a system for card issuance, that is designed to address many of the security concerns surrounding automated, self-service card issuance. The invention relies upon a combination of measures to enhance the security of the card issuance process. The security measures include tracking and auditing of the cards from a card loading site up to the time of card issuance to the customer, controlling physical access to the cards, and real time reporting and monitoring of card transactions and subsequent inventory changes.

12 Claims, 11 Drawing Sheets

FOREIGN PATENT DOCUMENTS

| | | |
|---|---|---|
| 2-22795 | 1/1990 | (JP) . |
| 2-24777 | 1/1990 | (JP) . |
| 2-113392 | 4/1990 | (JP) . |
| 2-230391 | 9/1990 | (JP) . |
| 4-24895 | 1/1992 | (JP) . |
| 7-160790 | 6/1995 | (JP) . |
| 7-210730 | 8/1995 | (JP) . |
| 8-016894 | 1/1996 | (JP) . |
| 8-106555 | 4/1996 | (JP) . |
| 8-255227 | 10/1996 | (JP) . |
| 8-329321 | 12/1996 | (JP) . |
| 9-102018 | 4/1997 | (JP) . |
| 9-138879 | 5/1997 | (JP) . |
| 9-223171 | 8/1997 | (JP) . |
| WO 86/04170 | 7/1986 | (WO) . |
| WO 92/17856 | 10/1992 | (WO) . |

* cited by examiner

CARD ISSUANCE SYSTEM AND PROCESS

FIELD OF THE INVENTION

The present invention relates to automated, self-service card issuing machines that issue cards, such as credit cards, smart cards, debit cards, ATM cards, identification cards, security cards and the like. More particularly, the present invention relates to processes for enhancing the security of card issuance from automated card issuing machines.

BACKGROUND OF THE INVENTION

Personalized cards bearing user specific information, such as credit cards, are typically issued to a user by sending the cards through the mail. In many areas of the world, the mail systems cannot be sufficiently relied upon. Thus, credit cards and other personalized cards are typically applied for and/or issued at the financial institution or other institution issuing the card. This is very inconvenient for the end user who must personally appear multiple times at the institution in order to apply for and/or obtain the issued card.

In addition, there are many instances where it is desirable for a user to be able to readily obtain a replacement card such as when a card is lost, stolen, damaged and/or destroyed. In many situations, such as when traveling, it is very inconvenient for the card holder to have to visit a financial institution in order to obtain a replacement or additional cards.

To resolve these issues, card issuance is evolving towards the use of automated, self-service card issuance machines to issue personalized cards directly to a customer. These card issuance machines, which in many respects operate similarly to an automated teller machine (ATM), allow a customer to select the type of card that is desired, with the machine then personalizing the card with customer information and subsequently issuing the card directly to the customer.

An automated, self-service card issuing machine is disclosed in published PCT application WO 92/17856. The card issuing machine described in this document is capable of issuing personalized cards, such as credit cards (i.e. MasterCard®, Visa®, etc.) at an unattended location directly to a customer, with the cards being personalized by the machine.

One of the overriding concerns in automated, self-service card issuing machines is the need for security of the cards that are to be issued by the machine. This is particularly true for machines that issue credit cards and other high value financial and retail cards, due to the high monetary values intrinsic to these types of cards. Thus, the cards must be secured against theft or unauthorized access thereto while in the machine, as well as being secured against theft and unauthorized access thereto while outside of the machine, such as while being transported to and from the machine.

What is needed then is a system and method for addressing security concerns involving the issuance of cards from card issuing machines.

SUMMARY OF THE INVENTION

The invention provides a method of secured card issuance from a card issuing machine, as well as a system for card issuance, that is designed to address many of the security concerns surrounding automated, self-service card issuance. The invention relies upon a combination of measures to enhance the security of the card issuance process. The security measures include tracking and auditing of the cards from a card loading site up to the time of card issuance to the customer, controlling physical access to the cards, and real time reporting and monitoring of card transactions and subsequent inventory changes.

In one embodiment in accordance with the invention, a method of card issuance from a card issuing machine that receives cards within a container from a card loading site, with the card issuing machine and the card loading site being in communication with a host controller, is provided. The method comprises: loading the container with cards at the card loading site; transmitting a loaded card inventory of the loaded cards to the host controller; transporting the loaded container from the card loading site to the card issuing machine, and loading the container into the card issuing machine; determining a received card inventory in the loaded container; and comparing the received card inventory with the loaded card inventory.

Since the host controller knows the inventory of the cards loaded into the container, a comparison of the card inventory after loading at the card loading site with the card inventory after loading the container into the machine can spot any discrepancies in the card inventory, thereby indicating a possible theft of cards during transport of the cards to the card issuing machine.

In accordance with yet another embodiment, a method of card issuance from a card issuing machine that receives cards within a container from a card loading site is provided. The method comprises loading the container with cards at the card loading site, and storing a loaded card inventory of the loaded cards into memory provided on the container; transporting the loaded container from the card loading site to the card issuing machine, and loading the container into the card issuing machine; reading the loaded card inventory from cassette memory; conducting an inventory scan of the cards actually in the container to determine an actual card inventory; and comparing the read loaded card inventory with the actual card inventory.

In accordance with another aspect of the invention, a card issuance system is provided comprising a card issuing machine having a container therein adapted to hold a plurality of cards for issuance by the card issuing machine. The container includes means for storing inventory information of the cards within the container. The system further includes a card loading site at which the container is loaded with the cards, and a host controller in communication with the card issuance machine and the card loading site.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

DETAILED DESCRIPTION OF THE INVENTION

Figure 1:
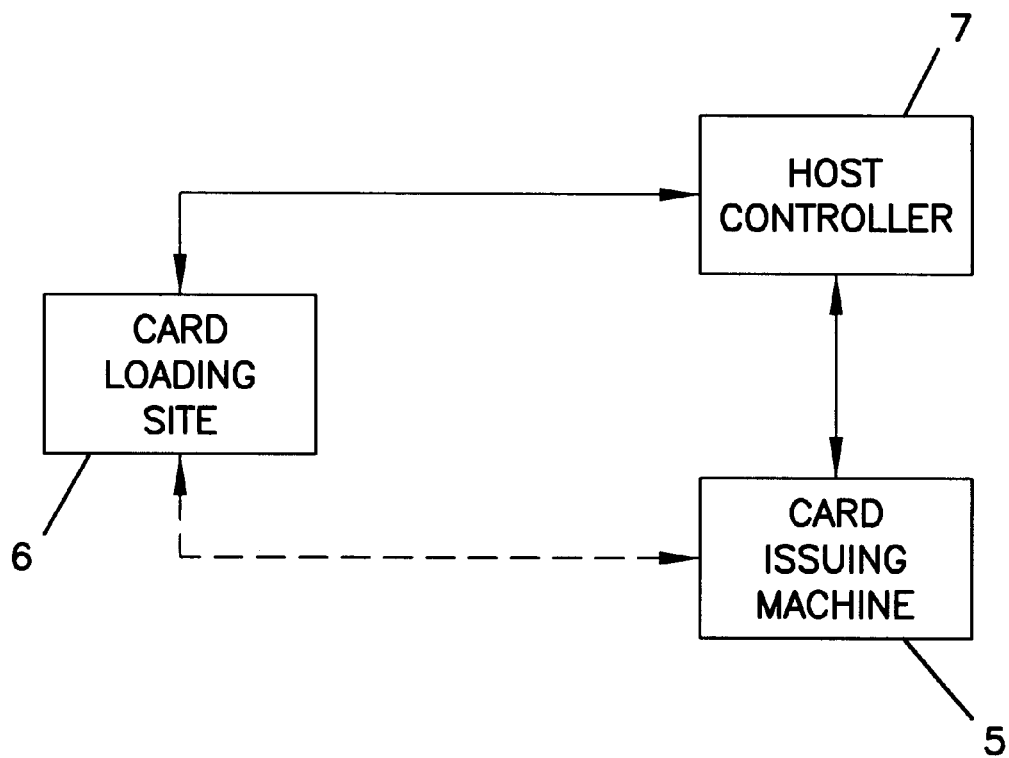
FIG. 1 is a block diagram illustrating the card issuance system in accordance with the principles of the invention.

With reference to FIG. 1, in one embodiment, the invention relates to a system, and method, for issuing cards, such as financial-related cards (e.g. credit cards, smart cards, debit cards, etc.) and/or security cards (e.g. identification cards, access cards, etc.) from an automated, self-service, card issuing machine 5. Cards to be issued from the machine 5 are provided from a card loading site 6, where the cards are loaded into one or more card cassettes or containers which are then transported to, and loaded into, the card issuing machine 5 for subsequent issuance of the cards. The card issuing machine 5 and the card loading site 6 are each in communication with a host controller 7 which coordinates the operations of the card issuing machine 5 and the card loading site 6.

Communication between the card issuing machine 5 and the host controller 7 and between the card loading site 6 and the host controller 7, is preferably implemented through modems and telephone lines. However other methods of communications could be used if desired, such as via wireless communication. In addition, the communications between the card issuing machine 5 and the host controller 7, and between the card loading site 6 and the host controller 7, are preferably encrypted using conventional encryption technology to increase the security of the communications. For instance, DES encryption can be used.

The card issuing machine 5 is an automated unit, similar to an ATM, that is capable of selecting a single card from a plurality of different types of cards provided in a card source, personalizing the card if necessary, and then issuing the card to the customer based upon the customer selection. A card issuing machine of this type is disclosed in copending application Ser. No. 09/189,959, filed on even date herewith, assigned to DataCard Corporation, and which is incorporated herein by reference.

As described in Ser. No. 09/189,959, the cards are disposed within a single container or cassette, with each card having its own discrete position thereby allowing any one of the cards to be picked from the container at any time as well as allowing the card issuing machine to know the exact location of each card within the container. The card issuing machine is provided with a user interface to allow a customer to select the desired type of card, with the machine then picking the appropriate card from the container and then directing the card to a personalization module where the card is personalized if necessary. After personalization, the card is directed to a delivery module which delivers the newly personalized card to the customer.

As mentioned previously, the cassette is preferably loaded with cards at the card loading site 6 and then transported to the card issuing machine 5, where it is loaded into the machine for subsequent issuance of the cards. One of the security concerns surrounding card issuance from automated card issuance machines is the need to ensure the security of the cards during the time of transport between the card loading site and the card issuing machine, as well as after the container is loaded into the machine. Thus, the container should be designed to prevent unauthorized access to the cards therein, thereby preventing tampering with, and theft of, the cards.

FIGS. 2–7 illustrate one implementation of a card container or cassette 10 that can be used with the invention for ensuring the security of the cards. In particular, the cassette 10 is designed to allow electronic storage thereon of a unique identification number that is readable by the machine 5 to ensure that the correct cassette is being inserted into the machine. The unique identification number is also readable by suitable means at the card loading site 6 to ensure that the correct cassette 10 is being loaded or has been returned from the machine 5.

Further, the cassette 10 includes an electronic lock mechanism associated therewith for locking the cassette until the cassette is inserted into the machine 5 and the machine releases the electronic lock mechanism. The electronic lock mechanism preferably remains locked until a correct lock code is received that matches a lock code stored in memory on the cassette., thereby unlocking the lock mechanism and enabling the cassette to be opened. The lock code should be changeable as desired to further increase security.

The cassette 10 is further designed to be able to electronically store inventory information pertaining to the cards that were loaded into the cassette 10 while outside of the machine 5, as well as storing inventory information pertaining to the current card inventory of the cassette while in use in the machine 5. When the cassette 10 is loaded into the machine 5, the machine 5 can read the inventory information stored on the cassette, as well as perform its own inventory scan of the cards in the cassette to ensure that the cards within the cassette match the cards that were initially loaded into the cassette.

In addition to the electronic security measures mentioned above, the cassette 10 is designed with unique mechanical security features to prevent access to the cards therein.

Figure 2A:
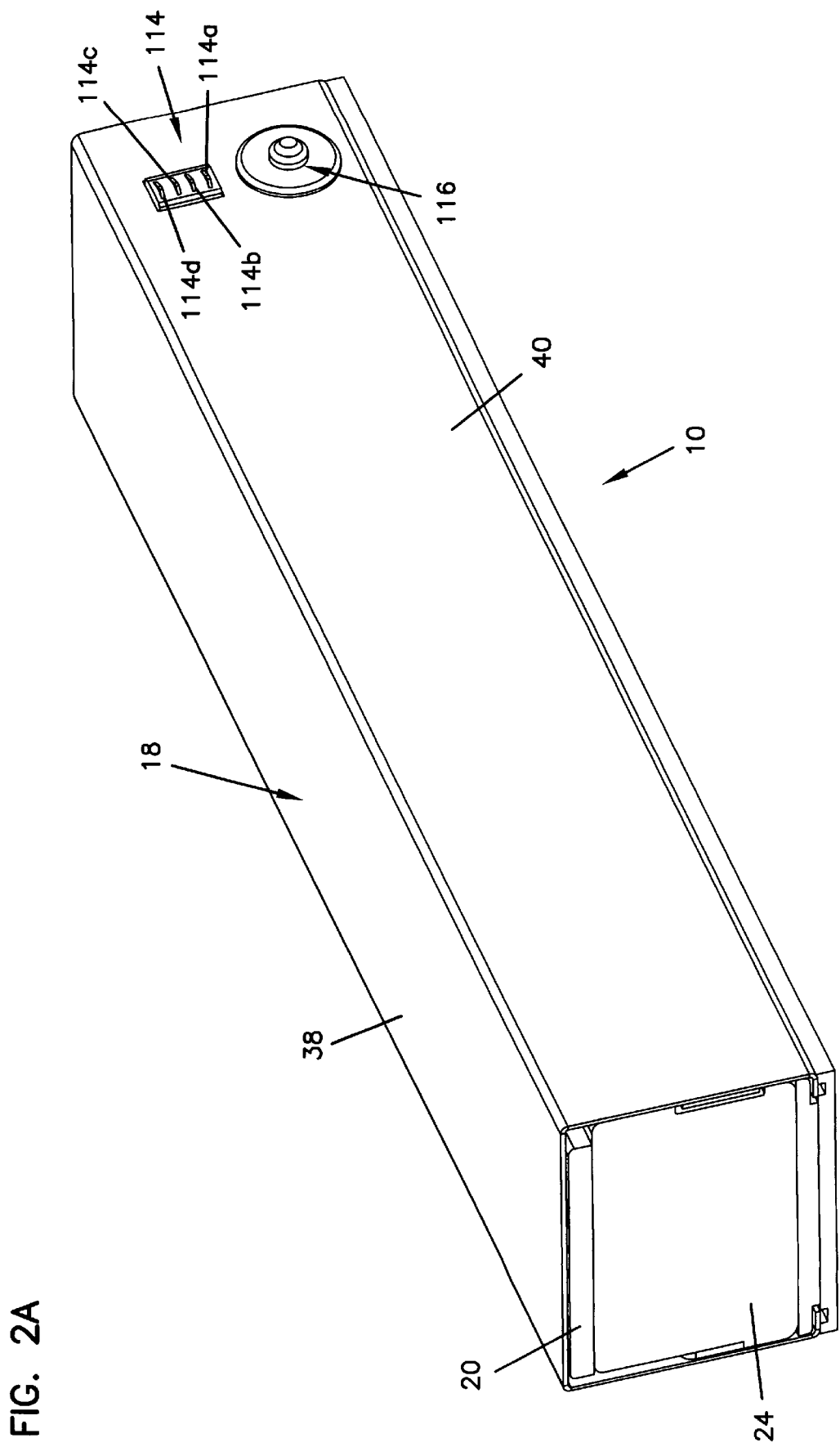
FIG. 2A is a perspective view of a cassette in accordance with the invention, with the cassette being in the closed position.
Figure 2B:
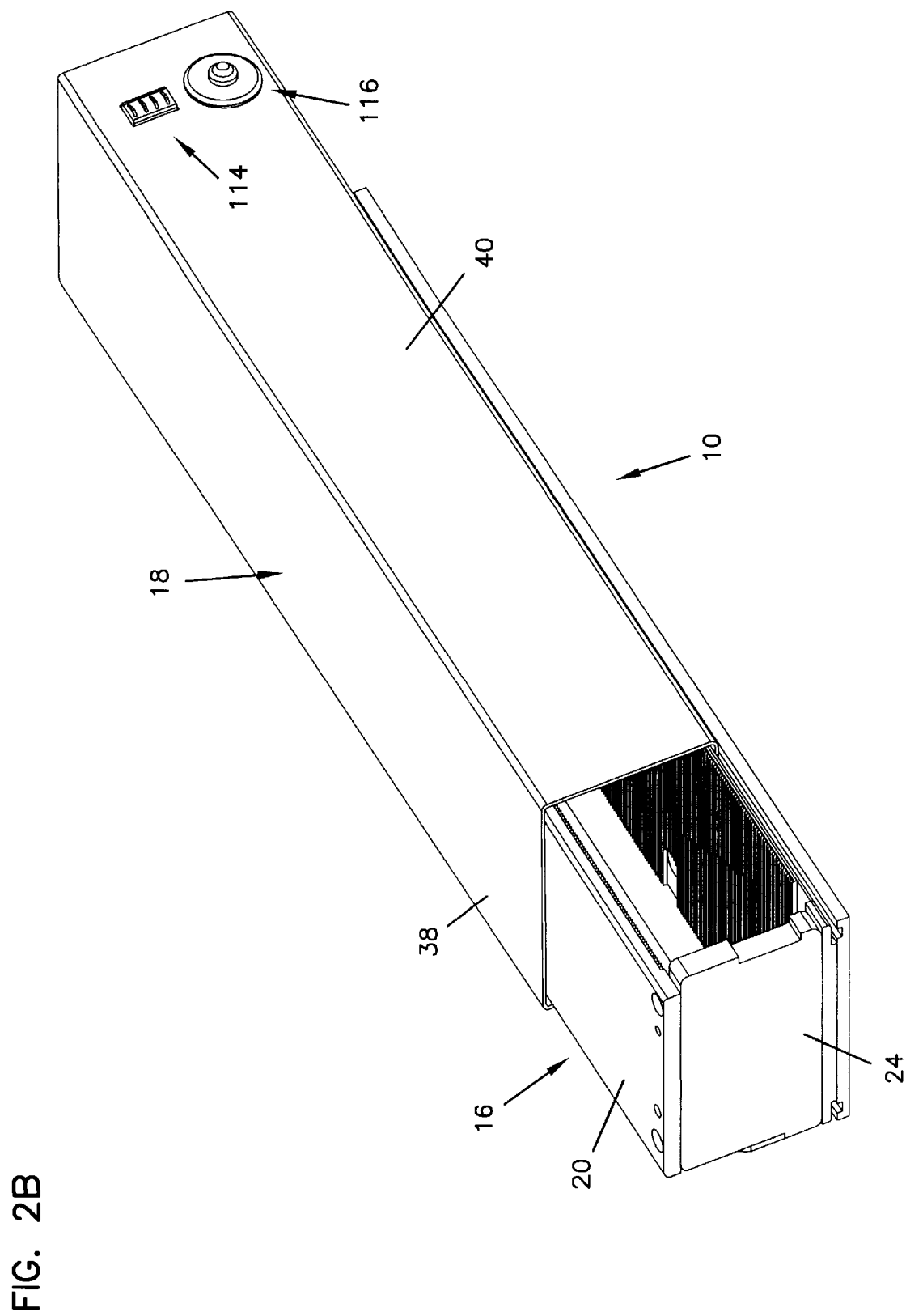
FIG. 2B is a perspective view of the cassette in a partially open position.

Referring to FIGS. 2A and 2B, it is seen that the cassette 10 includes an inner housing 16 that is substantially enclosed by an outer shell 18. The inner housing 16 and outer shell 18 are preferably made from magnesium, steel or other strong materials to discourage attempts at unauthorized access to articles within the cassette.

The cassette 10 is generally elongated and the inner housing 16 and outer shell 18 are slideable relative to each other along the longitudinal axis of the cassette between a closed position, shown in FIG. 2A, preventing access to the interior of the inner housing 16, and an open position, at which access to the interior of the inner housing 16 is permitted. FIG. 2B shows the inner housing 16 and the outer shell 18 at a partially open position. In one embodiment, the inner housing 16 is generally fixed to stationary structure within the machine 5, such that the outer shell 18 slides relative to the inner housing. However, it is to be realized that the outer shell 18 could instead be fixed to the stationary structure within the machine 5 such that the inner housing 16 slides relative to the outer shell. Further, the inner housing 16 and outer shell 18 could be designed to move relative to each other in ways other than sliding. For instance, the inner housing and outer shell could be pivotally connected to each other, such that the inner housing and outer shell pivot relative to each other between the closed and open positions.

Figure 3:
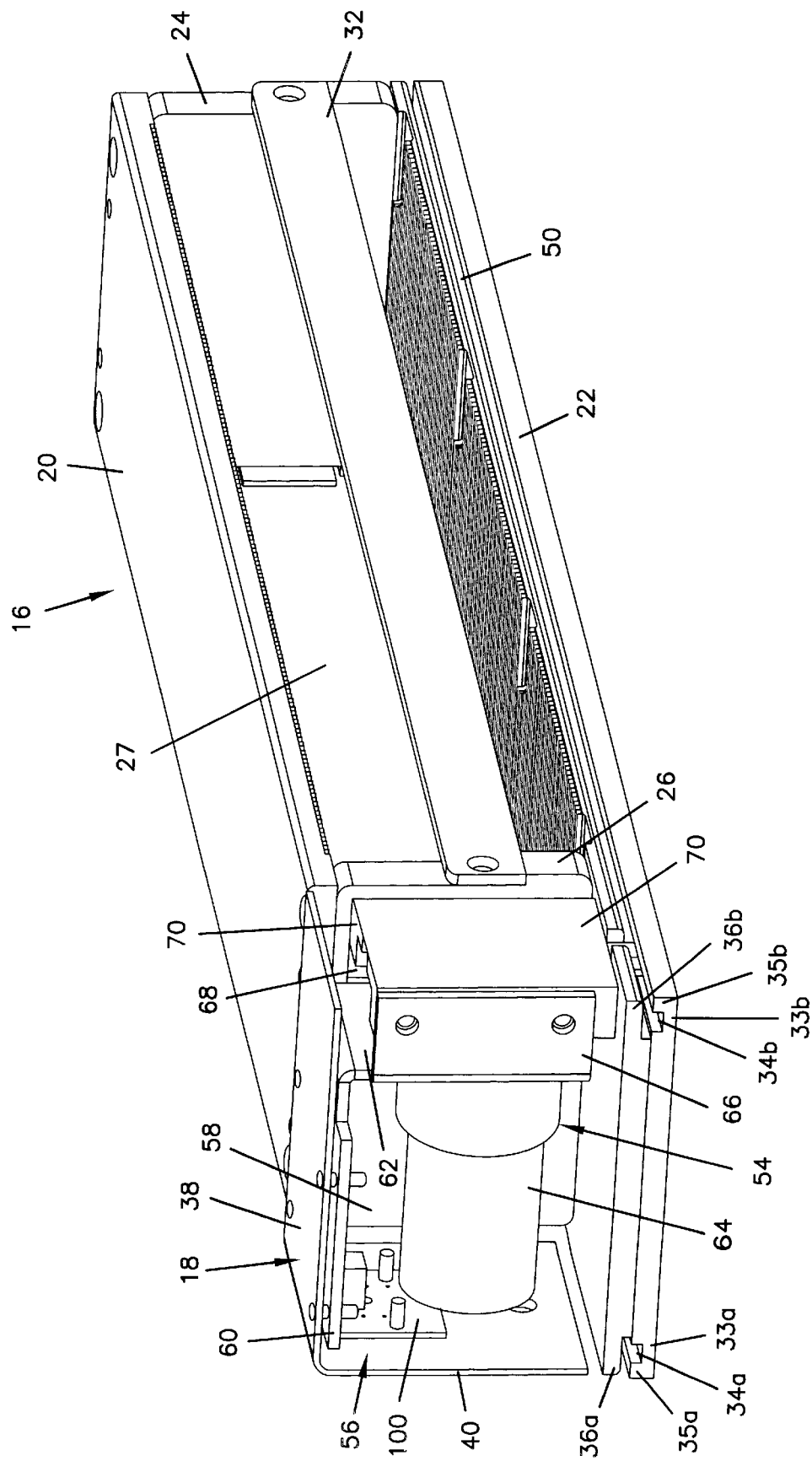
FIG. 3 is perspective view of the inner housing of the cassette, along with a portion of the outer shell.
Figure 4:
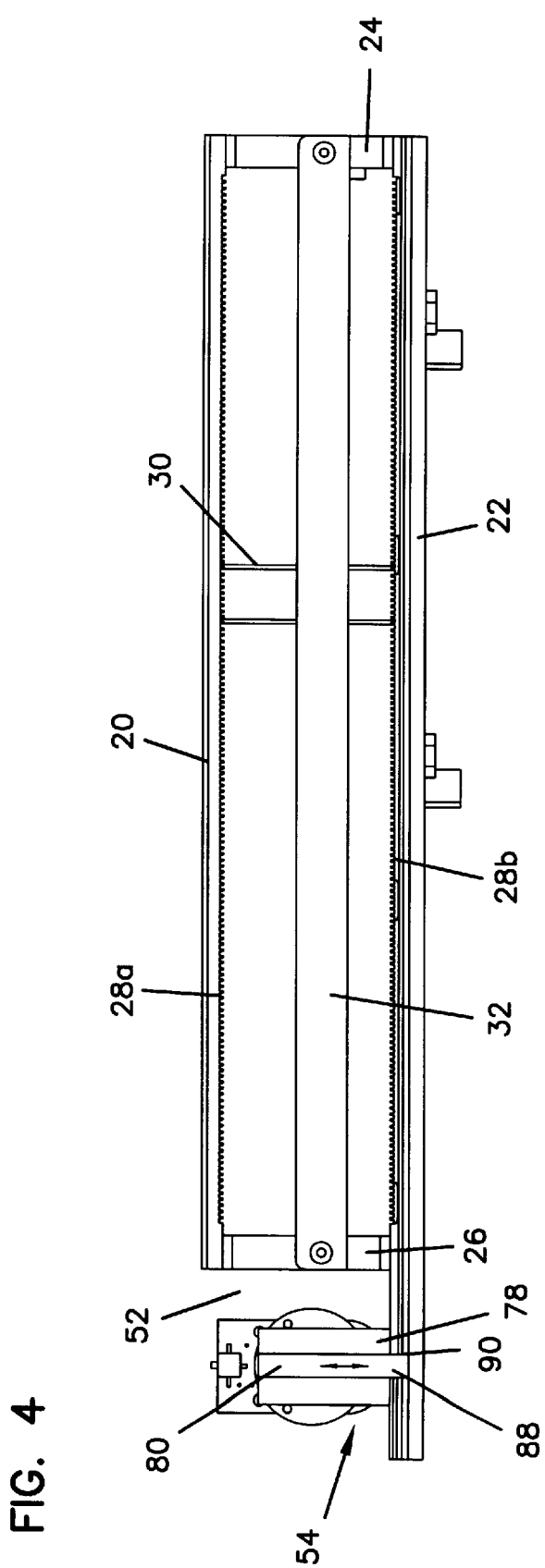
FIG. 4 is a side view of the inner housing illustrating its interaction with the lock mechanism.

Referring to FIGS. 3 and 4, it is seen that the inner housing 16 includes a top plate 20 and a bottom plate 22 that are spaced apart from each other by a pair of end walls 24, 26 to form an interior space 27. The top and bottom plates 20, 22 are formed with a plurality of aligned slots 28a, 28b into which top and bottom edges of a plurality of cards 30 are received such that the cards 30 are held within the interior space 27 of the inner housing 16. The slots 28a, b on the plates 20, 22 extend from one side of the inner housing 16 to the other side, and the slots on each plate are spaced apart along the axis of the cassette such that each card 30 is held at a discrete position.

The inner housing 16 can be designed to hold any number of cards 30, such as 200–300 cards. Since each card 30 is held at a discrete position, the location of each card 30 in the cassette 10 can be determined and any one of the cards 30 can be selected at any time. Therefore, the cards 30 can be a variety of different types, i.e. VISA®, MASTERCARD®, debit, etc. since any one card can be selected, thereby eliminating the need for a separate cassette for each different card type. A suitable mechanism for selecting a card from the inner housing is described in copending patent application Ser. No. 09/049,250, filed on Mar. 27, 1998, assigned to DataCard Corporation, and which is hereby incorporated by reference.

Figure 5A:
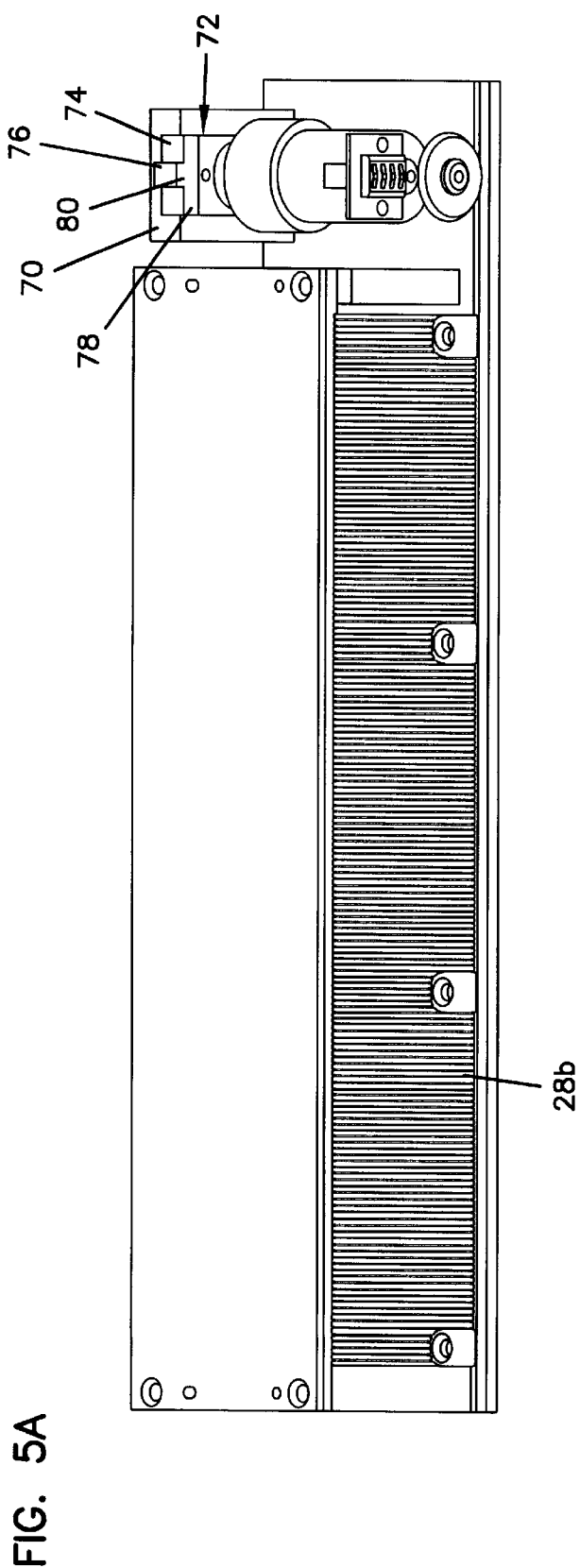
FIG. 5A is a top perspective view of the inner housing and the lock mechanism.

Further, the cards 30 can either be unpersonalized (e.g. blank) or pre-personalized depending upon whether the cassette 10 is used with a machine 5 that is able to personalize the cards. A bar 32 is connected at each of its ends to the end walls 24, 26 on one side of the inner housing 16, while the other side of the inner housing 16 is open as shown in FIG. 5A, so that the cards 30 can only be withdrawn from the open side of the inner housing 16.

With reference now to FIG. 3, it is seen that the bottom plate 22 includes a pair of outwardly extending flanges 33a, 33b on each side thereof, with channels 34a, 34b formed in the flanges 33a, b extending generally parallel to the longitudinal axis of the inner housing 16. The channels 34a, b are adapted to receive complementary portions of the outer shell 18 to allow relative longitudinal sliding movements of the inner housing 16 and outer shell 18, as will be described below. A pair of radial lips 35a, 35b are thus formed at the end of each flange 33a, b, which act as a means for preventing disconnection of the outer shell from the inner housing, as will be described in detail later.

As FIG. 3 further shows, the bottom plate 22 is provided with a pair of flanges 36a, 36b which extend over the flanges 33a,b, respectively, and prevent access to the channels 34a, b from above. The flanges 33a, b, channels 34a, b, lips 35a, b and flanges 36a, b thus form tracks which receive portions of the outer shell therein to permit relative sliding movements of the inner housing 16 and outer shell 18 along the longitudinal axis of the cassette 10.

Figure 6:
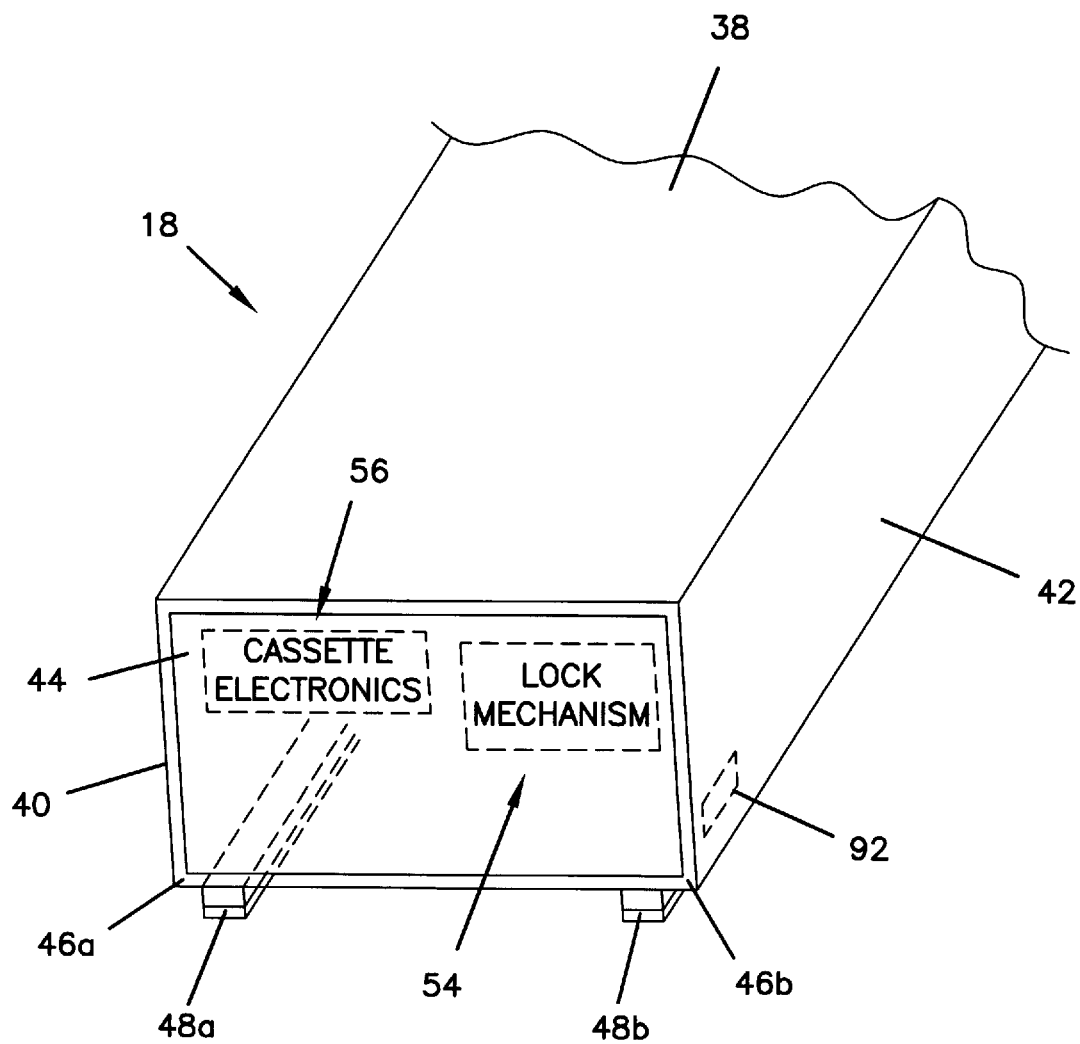
FIG. 6 is a perspective view of the outer shell of the cassette.

The outer shell 18, shown in detail in FIG. 6, is a generally hollow structure formed by a top wall 38, a first side wall 40, a second side wall 42, and an end wall 44. The top wall 38 is slideably disposed over the top plate 20, and the side walls 40, 42 are slideably disposed over the sides of the inner housing 16 such that the cards 30 in the interior space 27 of the inner housing 16 can be completely enclosed, as is shown in FIG. 2A.

Each sidewall 40, 42 includes inwardly turned flanges 46a, 46b that are adapted to be slideably disposed between the sets of flanges 33a, b and 36a, b, as can be seen in FIGS. 2A–B. Rails 48a, 48b are formed on the bottom of the flanges 46a, b and are slideably received within the channels 34a, b, respectively, whereby the outer shell 18 and inner housing 16 are slideable relative to each other. The flanges 46a, b and rails 48a, b thus form slides that are receivable in the tracks of the inner housing 16 to permit the relative sliding movements between the inner housing and outer shell.

The rails 48a, b extend along only a portion of the bottom of the flanges 46a, b, since, as shown in FIG. 3, each channel 34a, b is filled adjacent one end of the inner housing 16 thereby forming stops 50 (only one being visible). The stops 50 are adapted to engage the rails 48a, b when the inner housing 16 and outer shell 18 reach the closed position, thereby preventing movement past the closed position.

As can be seen from FIGS. 2A–B, when the rails 48a, b are disposed in the channels 34a, b, the lips 35a, b prevent the rails 48a, b from being forced outward out of the channels 34a, b. Thus, the sidewalls 40, 42 or the flanges 46a, b cannot be forced outward by a person attempting to gain access to the contents of the cassette, since the rails 48a, b will contact the lips 35a, b thereby preventing such movement. Further, due to the flanges 36a, b overlying the channels 34a, b, the flanges 46a, b cannot be pried upwardly by a person attempting to gain access to the contents of the cassette. Therefore, the design of the slides and tracks makes it difficult to force open the cassette to gain access to the cards.

With reference to FIG. 4, it is seen that the bottom plate 22 extends past the top plate 20, such that a space 52 exists at the end of the inner housing 16 between the end wall 26 and the end of the bottom plate 22. The end of the outer shell 18 adjacent the end wall 44 is provided with a lock mechanism 54 and cassette electronics 56 that are fixed to the outer shell and are disposed within the space 52 when the outer shell 18 is in the closed position.

In particular, as best shown in FIG. 3, the end of the outer shell 18 includes a cavity 58 that is formed by a plate 60 secured to the inside surface of the top wall 38, and a plate 62 connected to the plate 60 and extending downward toward the bottom plate 22 facing the sidewall 40. The cavity 58 is closed off by the endwall 44 of the outer shell 18. The lock mechanism 54 includes an electric motor 64 that is connected to the plate 62 and is disposed inside the cavity 58. In addition, a pair of side plates 66, 68 are connected to the plate 62 and extend toward the other sidewall 42 of the outer shell 18. A lock receiving member 70 of the lock mechanism 54 is fixed between the side plates 66, 68 and a lock member 72 that is actuated by the motor 64 for selectively locking the outer shell 18 and the inner housing 16 is slideably disposed within the member 70.

Figure 5B:
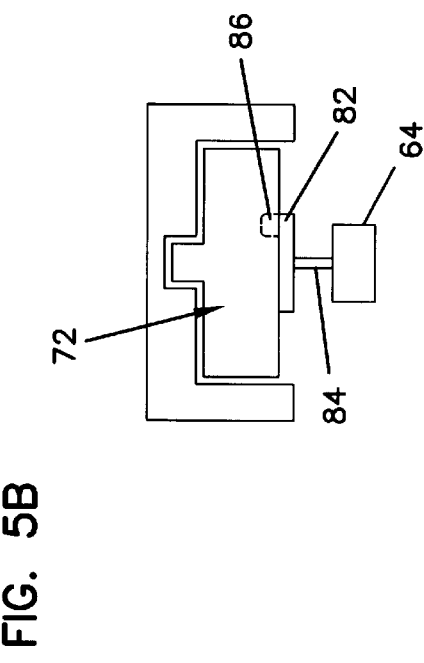
FIG. 5B is a top view of an eccentric mechanism for actuating the locking mechanism.

As best seen in FIGS. 5A–B, the lock receiving member 70 is formed with a channel 74 having a central recess 76. The lock member 72 includes a bar 78 adapted to be received within the channel 74 and a projection 80 that is received within the central recess 76, whereby the lock member 72 is slideable upwardly and downwardly relative to the member 70. A rotatable output shaft 84 of the motor 64 extends through the plate 62 and is suitably connected to the lock member 72 such that the rotary input of the motor 64 is converted into linear upward and downward movements of the lock member 72.

One type of mechanism for converting a rotary input into a linear output movement is shown in FIG. 5B. The mechanism includes a disk 82 that is connected to the output shaft 84 of the motor 64. The disk 82 includes an eccentric pin 86 fixed thereto that is disposed within a hole in the lock member 72. When the shaft 84 rotates, a vertical force is exerted on the lock member 72 by the pin 86 thereby driving the lock member 72 upwardly and downwardly, depending upon the rotation direction of the shaft 84.

As seen in FIGS. 3 and 4, the projection 80 extends past the bar 78, thereby forming a finger 88 that is used to lock the inner housing 16 and outer shell 18. The flange 36b includes a slot 90 therein to allow the finger 88 to pass downward into the channel 34b. Further, as shown in dashed lines in FIG. 6, the flange 46b includes a hole 92 therethrough to allow passage of the finger 88 through the flange 36b. Therefore, when the outer shell 18 and the inner housing 16 are at the closed position and the lock member 72 is actuated downward, the finger 88 extends through the slot 90 and the hole 92 and down into the channel 34b, thereby preventing relative sliding movement of the inner housing 16 and the outer shell 18. In order to permit sliding movement to the open position, the finger 88 must be withdrawn from the channel 34b, hole 92 and slot 90 by actuating the slide member 72 upwardly.

The cassette electronics 56 for controlling operation of the motor 64 and for providing a variety of electronic security features for the cassette 10 are also disposed within the cavity 58. As shown in FIG. 3, a circuit board 100 is mounted to the sidewall 40, with the cassette electronics 56 being disposed on the circuit board 100.

Figure 7:
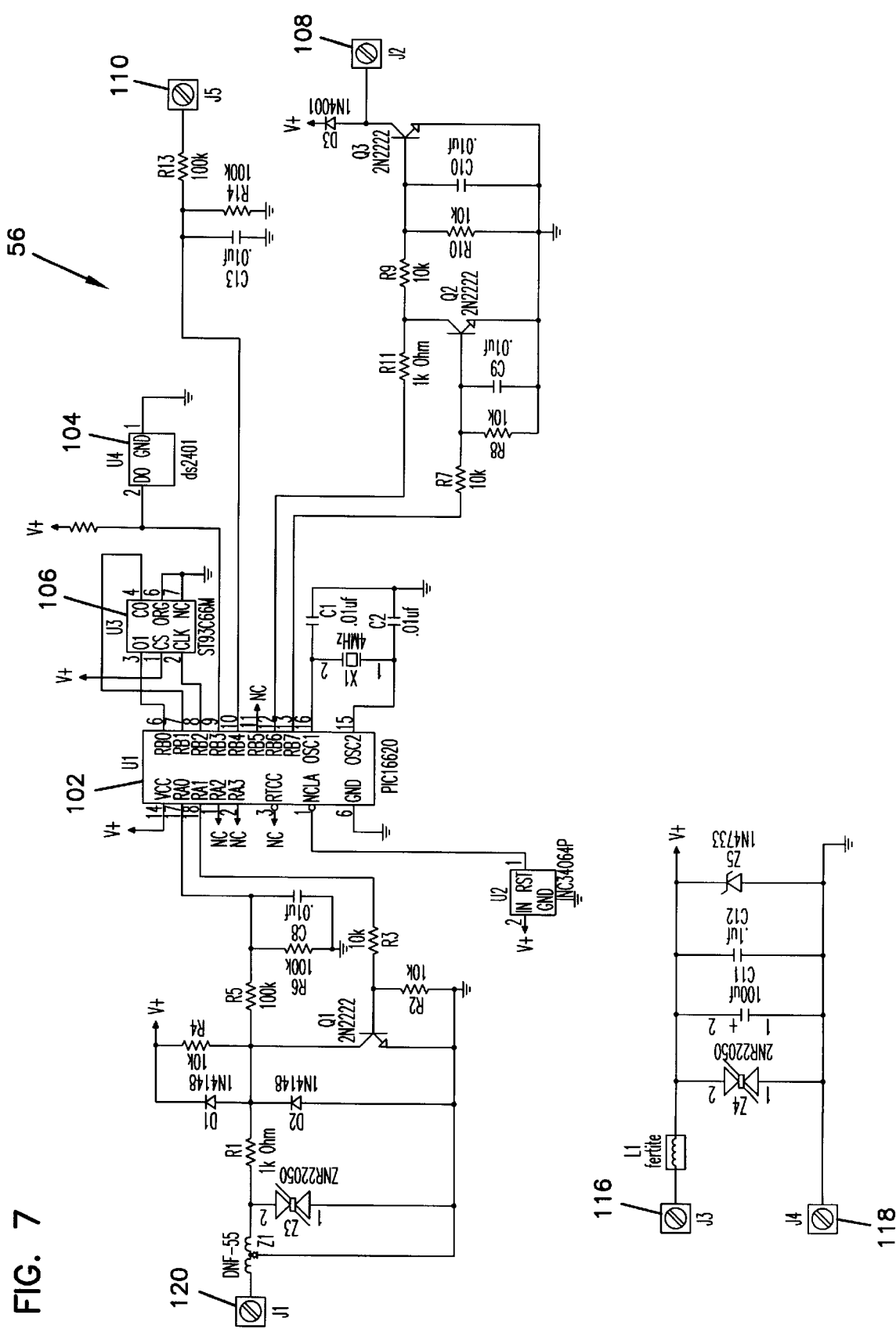
FIG. 7 is an electrical schematic showing the electronics associated with the cassette.

FIG. 7 is an electrical schematic of the cassette electronics 56 which includes a microprocessor 102 acting as the controller for the cassette 10. A first memory means 104 is provided having a unique identification number stored therein that uniquely identifies the cassette 10. The identification number is preferably at least 48 bits, is unique, and should not be alterable in order to prevent someone from changing the number. A suitable memory means 104 for use with the invention comprises a DS2401 Silicon Serial Number device, manufactured by Dallas Semiconductor of Dallas, Tex.

Additional memory means 106 is provided for electronically storing a lock code therein for controlling operation of the lock mechanism 54 through a driver output 108. The lock code should be at least 48 bits. The memory means 106 can also contain control logic for controlling the operation of the electronics 56. A suitable memory means 106 for use with the invention comprises a conventional 4 kB EEPROM.

The cassette 10 must receive the correct lock code from the machine 5 after insertion of the cassette in order to allow the lock mechanism to unlock the cassette. Once the correct lock code is received, power is routed to the motor 64 through the driver output 108, thereby actuating the motor which actuates the lock member 72 upwardly to withdraw the finger 88. When the finger is withdrawn, the cassette can then be opened.

Preferably, the lock code is changeable for security purposes, thus the memory means 106 must be capable of being written to so that the lock code can be changed. However the lock code should be changeable only upon receipt of proper security authorization. For instance, authorization to change the lock code can be directly linked to the ability to open the cassette (i.e. when the cassette is physically or electronically opened, the lock code is authorized to be changed). Information pertaining to the opened/closed state of the cassette 10 is provided to the controller 102 through an interlock input 110 that is connected to one or more sensors which sense the open/close state of the cassette, or which sense the condition of the lock mechanism 54 thereby providing an indication of whether the cassette can be opened.

The memory means 106 also stores information pertaining to the inventory of the cards 30 contained within the cassette 10. The inventory must be readable at any time to allow access to the information, and the inventory information that is stored in the memory means 106 is preferably encrypted using known encryption techniques in order to increase the security of the inventory data and prevent tampering with or alteration of the data. Either the host controller 7 or the machine 5 are provided with suitable decryption capability in order to be able to read the encrypted inventory data.

Since the memory means 106 is capable of being written to, the cassette inventory information can be initially stored therein upon loading, as well as enabling the inventory information to be periodically updated while the cassette is in use in the machine. However, the inventory information is preferably updated only when the cassette is unlocked.

Thus, upon loading the cassette 10 with cards 30, information pertaining to the cards, such as the type of each card and their discrete locations in the cassette, can be stored in the memory means 112. Once transported to, and loaded in, the machine 5, the machine can perform a scan of the cards in the cassette and compare the results with the inventory information stored in the memory means 112 to determine whether a discrepancy exists. If a discrepancy exists, it would indicate that a potential tampering or theft of one or more cards has occurred. During the time that the cassette remains in the machine, the machine can update the current inventory information of the cassette, such as after dispensing a card to a customer.

To aid in performing a scan of the cards in the cassette, each card is preferably encoded to allow the machine to determine the presence of the card as well as the type of card by reading the encoding on each card. The encoding could be provided on the magnetic stripes for cards having magnetic stripes, on the smart card chip for smart cards, or any specially provided encoding located on each card. By reading the encoding, the inventory scan can determine whether the correct card is in the correct discrete position in the cassette to aid in detecting the occurrence of potential tampering or theft.

To discourage tampering with the electronics 56, the elements within the cavity 58, including the electronics 56 and the motor 64, are preferably potted, or otherwise sealed. Further, as is evident from the figures, the cavity 58, and thus the electronics 56, are not accessible either in the open or closed position of the cassette, thereby further increasing security.

In order to provide electrical power input and data input/output to and from the cassette 10, a four pin electronic interface 114 having four contacts 114a–d, as best seen in FIGS. 2A–B, is provided on the exterior of the outer shell 18 such as on the sidewall 40 opposite the circuit board 100. The electronics 56 include two pins 116, 118 that are connected to two of the contacts 114a, b thereby providing power input to the cassette. A further pin 120 is connected to one of the two remaining contacts 114c, d to enable data input/output to and from the cassette.

The outer shell 18 of the cassette further includes a button 116 on the exterior surface thereof adjacent the interface 114. The button 116 projects outward from the outer shell, and is designed to fit into a socket that is formed within the machine 5. The button 116 forms a means for mechanically indexing the cassette 10 relative to the machine to ensure that the cassette gets aligned correctly when inserted into the machine. Thus, if the cassette is not inserted properly, the button will not fit into the corresponding socket. Further, since the button 116 is located adjacent the interface 114, the contacts 114a–d will not be engaged to provide electrical power or data communication, unless the button 116 is properly fit into the socket. Preferably, the two contacts 114c, d of the interface are shorted together which enables the machine 12 to recognize that the cassette 10 has been correctly inserted. Therefore, opening of the cassette does not occur until the cassette has been properly inserted.

While the use of two separate memory means has been described and shown herein, it should be realized that the invention could utilize a single memory means in place of the two separate memory means if desired. However, if a single memory means is used, the identification number would have to be stored in such a manner that it could not be changed.

Figure 8:
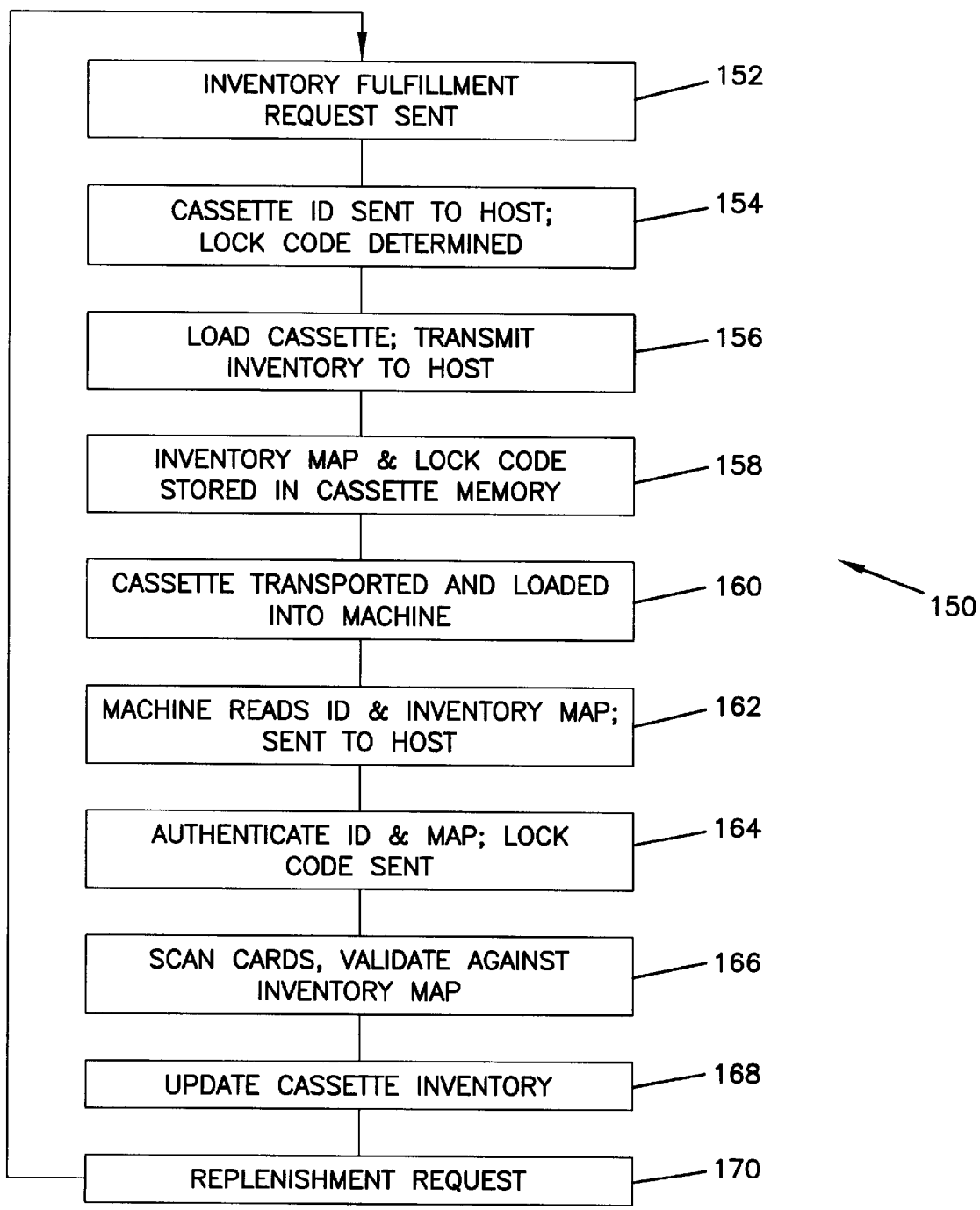
FIG. 8 is a block diagram of an embodiment of the card issuance process in accordance with the invention.

With reference now to FIG. 8, a process 150 of card issuance from the card issuing machine 5 is schematically illustrated. At block 152, an inventory fulfillment request is sent by the host controller 7 to the card loading site 6. The inventory fulfillment request is determined by the host controller 7 in response to a card replenishment need at the card issuing machine 5. For purposes of this description, it will be assumed that the cassette 10 that is loaded at the card loading site will replace a cassette that is already in place in the card issuing machine 5, and thus the inventory fulfillment request should not only account for the cards that have been dispensed from the machine 5, but it should also account for the cards that still remain within the machine. However, it is contemplated that the inventory fulfillment request could reflect only those cards that have been issued, such that the cards loaded at the card loading site 6 merely supplement the cards already within the machine 5.

At block 154, the unique cassette identification number is sent from the card loading site 6 to the host controller 7 so that the host controller knows which cassette is being loaded. Further, at this time, the host controller 7 calculates a new lock code that is to be used to control operation of the lock mechanism 54.

The cassette is loaded in accordance with the inventory fulfillment request, at block 156. Once loading is complete, a map of the card inventory is transmitted to the host controller 7 where it is stored in memory. Further, the host controller 7 transmits the new lock code to the card loading site 6 so that it can be programmed into the cassette.

At block 158, the inventory map, along with the new lock code, are programmed into the cassette memory, and the cassette is then closed and locked. Thus, the inventory of the cards that have been loaded into the cassette is known by the host controller 7, as well as being stored in memory on the cassette. After the cassette is closed and locked, the cassette is transported to and loaded into the machine 5, at block 160.

Once the cassette has been properly loaded into the machine, and while the cassette is still locked, the card issuing machine 5 reads the cassette identification number and the inventory map, at block 162, and transmits them to the host controller 7. At block 164, the host controller 7 authenticates that the correct cassette has been inserted into the machine by comparing the identification number and inventory map sent by the machine 5 with the identification number and inventory map sent by the card loading site 6. If there is a proper authentication, the host controller 7 transmits the lock code to the card issuing machine 5 to enable the cassette to be opened.

At block 166, when the cassette is opened, the card issuing machine 5 conducts an inventory scan of the cards in the cassette. The inventory scan is performed by mapping the location and type of each card in the cassette. The inventory scan is then transmitted to the host controller for validation with the stored inventory map. Thus, not only is the inventory map stored in cassette memory compared with the initial loaded inventory map, but the actual card inventory in the cassette after loading is also compared with the initial loaded inventory map.

At block 168, as the cassette is emptied of cards during use, the inventory map in the memory of the cassette, as well as the inventory map of the host controller 7, can be continuously updated, such as after every card issuance, to ensure that an updated version of the card inventory is known at all times. Thus, each time that a card is issued, information pertaining to the card type and its previous location within the cassette can be transmitted to the host controller in order to update the card inventory map. Further, periodic inventory scans can be performed after loading to verify that the actual card inventory has not changed, except for known card issuances.

After a predetermined use time, or when the card inventory starts running low, the card issuing machine 5 sends a replenishment request, at block 170, to the host controller 7, which in turn determines the inventory fulfillment request that is sent to the card loading site at block 152.

Thus, the card issuance process 150 of the invention provides security measures for card issuance from automated, self-service card issuing machines. The process 150 audits and tracks the cards from the point of loading into the cassette all the way to the point of issuance to the customer from the issuing machine. In addition, real time monitoring and reporting of individual card transactions, as well as operational anomalies of card issuing machine operation, further enhances the security of the card issuance process.

Although the above described embodiment relies upon communication with a host controller 7 during the card issuance process, card issuance does not require communication with a host controller.

Figure 9:
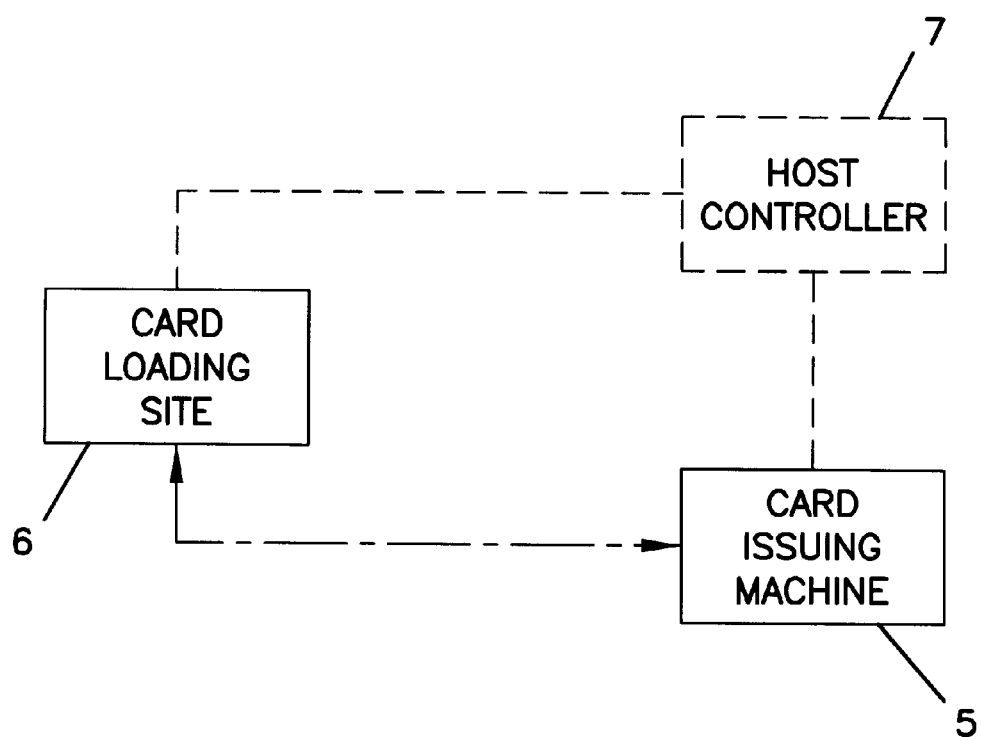
FIG. 9 is a block diagram illustrating an alternate embodiment of the card issuance system.

FIG. 9 illustrates an embodiment in which communication with a host controller is not required, particularly for the purpose of verifying card inventory upon insertion of the cassette into the machine 5. In this embodiment, the cassette would be loaded with cards at the card loading site, and the card inventory stored in cassette memory, as in the previous embodiment. The lock code would be determined at the loading site 6 and programmed into memory. In addition, an encrypted lock code key would also be stored in memory. The machine 5 would be provided with the capability to decrypt the lock code key upon insertion of the cassette therein, to enable the machine to open the lock mechanism, without the need for communication with the host controller. The cassette ID in this embodiment is not determinative on whether to allow the cassette to be opened, and the ID can simply be used for tracking purposes for showing that a particular cassette has been inserted into the machine.

Upon decrypting the lock code key and sending the lock code key to the cassette to thereby unlock the lock mechanism and enable the cassette to be opened, the machine opens the cassette and performs an inventory scan of the cards actually in the cassette, and compares the inventory scan with the cassette inventory stored in cassette memory to determine any discrepancies. In the event that a discrepancy is detected, the machine 5 has the option of closing the cassette and preventing transactions and/or transmitting the detected discrepancy to the host controller and receive further instructions therefrom.

Thus, verification and authentication of the cassette are performed locally by the machine 5, without requiring communication with the host controller 7. However, as indicated by dashed lines in FIG. 9, communication between the machine 5 and the host controller 7 and between the loading site 6 and the controller 7 can still occur, however such communications is not for the purpose of deciding whether the cassette should be opened and whether the card inventory is correct.

Figure 10:
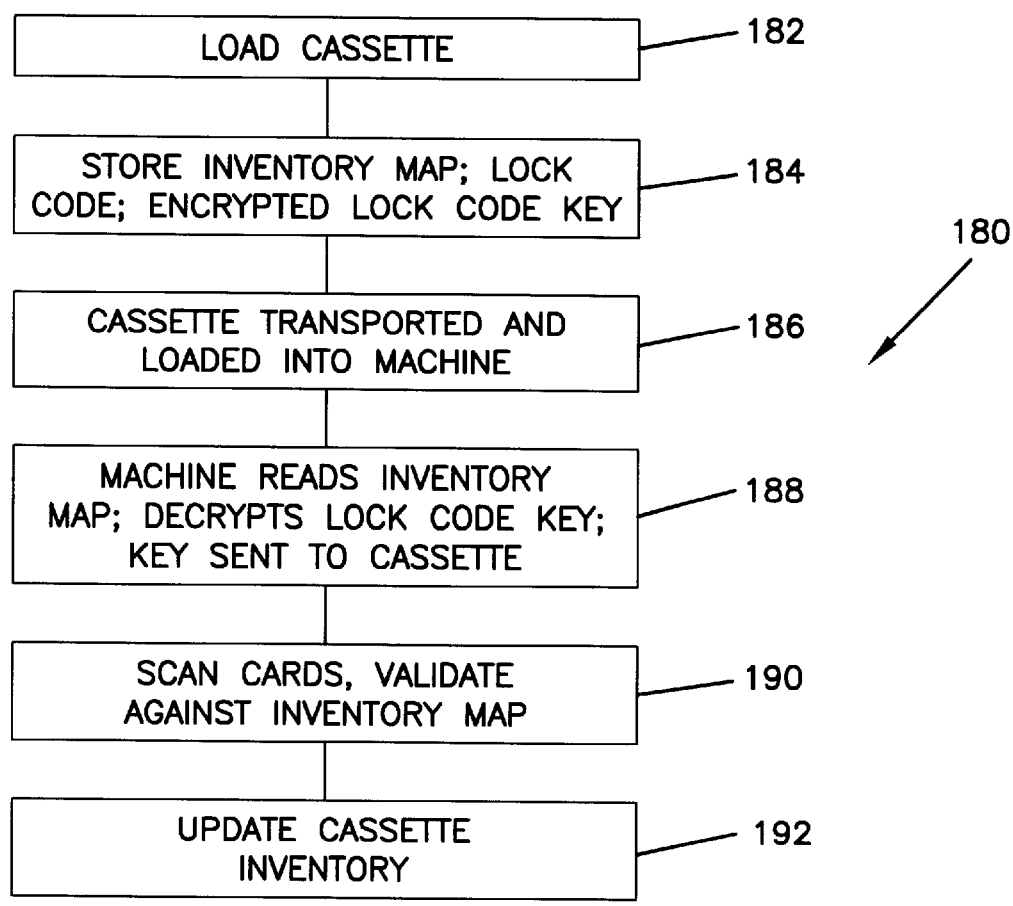
FIG. 10 is a block diagram of the card issuance process for the embodiment of FIG. 9.

FIG. 10 illustrates a process of card issuance 180 used with the system shown in FIG. 9. At block 182, the cassette 10 is loaded with cards based upon a predetermined desired card inventory. At block 184, once loading is complete (or even before or after loading if desired), the card inventory map is stored in cassette memory, along with a lock code and an encrypted lock code key for operating the lock mechanism. The lock code and the lock code key can either be determined locally at the loading site, or they can be communicated from the host controller.

At block 186, the cassette is transported to, and loaded in, the machine 5. The machine then reads the inventory map, at block 188. In addition, the machine decrypts the lock code key, and sends the key back to the cassette. If the lock code key is correct, the lock mechanism can unlock to allow the cassette to open. However, if the lock code key is incorrect, the cassette will remain locked thereby preventing any card transactions from the cassette.

Assuming that the lock code key is correct, the cassette is opened by the machine 5, and the machine conducts an inventory scan of the cards actually in the cassette at block 190. The inventory scan can then be compared against the inventory map read from the cassette memory to detect the presence of any discrepancies. Thus, in this embodiment, the authority to open the cassette as well as the checking of card inventory, is performed locally by the machine 5, without requiring communication with, or intervention by, the host controller 7.

As in the previous embodiment, as card transactions take place and the cassette is emptied of cards, the machine will keep track of the instantaneous card inventory, at block 192, and keep an updated record of the current card inventory.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of card issuance from a card issuing machine that receives cards within a container from a card loading site, with the card issuing machine and the card loading site being in communication with a host controller, the method comprising:

loading the container with cards at the card loading site;

transmitting a loaded card inventory of the loaded cards to the host controller, the loaded card inventory comprising information on type of cards loaded into the container and a position of each card within the container;

transporting the loaded container from the card loading site to the card issuing machine, and loading the container into the card issuing machine;

determining a received card inventory in the loaded container, the received card inventory comprising information on the type of cards within the container and the position of each card within the container; and comparing the received card inventory with the loaded card inventory.

2. The method according to claim 1, wherein the container includes means for storing information, and further including storing the loaded card inventory in the means for storing information.

3. The method according to claim 2, wherein determining a received card inventory comprises reading the loaded card inventory from the means for storing information.

4. The method according to claim 3, wherein comparing the received card inventory with the loaded card inventory comprises transmitting the read loaded card inventory to the host controller, and comparing the read loaded card inventory with the loaded card inventory at the host controller.

5. The method according to claim 2, wherein determining a received card inventory comprises using the card issuing machine to take an actual card inventory of the cards in the loaded container.

6. The method according to claim 5, wherein comparing the received card inventory with the loaded card inventory comprises transmitting the actual card inventory to the host controller, and comparing the actual card inventory with the loaded card inventory.

7. The method according to claim 2, wherein the container includes an electronic lock mechanism thereon for locking the container, the electronic lock mechanism being operable by a lock code, and further including storing the lock code in the means for storing information at the card loading site.

8. The method according to claim 7, further including transmitting the lock code from the host controller to the card issuing machine in order to operate the electronic lock mechanism.

9. The method according to claim 2, wherein the container includes a unique identification number stored in the means for storing information, and further including transmitting the unique identification number from the card loading site to the host controller, reading the unique identification number after the container is loaded into the card issuing machine, and comparing the transmitted unique identification number with the read unique identification number.

10. The method according to claim 1, further including transmitting a card inventory fulfillment request from the host controller to the card loading site, and wherein loading the container with cards comprises loading the container with cards based on the card inventory fulfillment request.

11. The method according to claim 1, further comprising updating the card inventory in the container as the container is emptied of the cards.

12. A method of card issuance from a card issuing machine that receives cards within a container from a card loading site, the method comprising:

loading the container with cards at the card loading site, and storing a loaded card inventory of the loaded cards into memory provided on the container, the loaded card inventory comprising information on type of cards loaded into the container and a position of each card within the container;

transporting the loaded container from the card loading site to the card issuing machine, and loading the container into the card issuing machine;

reading the loaded card inventory from cassette memory;

conducting an inventory scan of the cards actually in the container to determine an actual card inventory, the actual card inventory comprising information on the type of cards within the container and the position of each card within the container; and comparing the read loaded card inventory with the actual card inventory.

* * * * *